(12) United States Patent
Orr

(10) Patent No.: US 8,610,409 B2
(45) Date of Patent: Dec. 17, 2013

(54) CONTROLLER WITH PUNCTUATED SWITCHING CONTROL CIRCUIT

(71) Applicant: Power Integrations, Inc., San Jose, CA (US)

(72) Inventor: Raymond K. Orr, Kanata (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/753,075

(22) Filed: Jan. 29, 2013

(65) Prior Publication Data

US 2013/0141955 A1 Jun. 6, 2013

Related U.S. Application Data

(63) Continuation of application No. 12/904,061, filed on Oct. 13, 2010, now Pat. No. 8,379,420.

(51) Int. Cl.
*G05F 5/00* (2006.01)

(52) U.S. Cl.
USPC ................................ 323/207; 363/89; 363/90

(58) Field of Classification Search
USPC ................. 363/80, 81, 82, 84, 85, 88, 89, 90; 323/207, 222, 223, 224, 271, 282
See application file for complete search history.

(56) References Cited

U.S. PATENT DOCUMENTS

| | | | | |
|---|---|---|---|---|
| 6,531,854 | B2 | 3/2003 | Hwang | |
| 7,256,569 | B2 | 8/2007 | Wu et al. | |
| 7,855,524 | B2 * | 12/2010 | Pummer | 318/438 |
| 2006/0176029 | A1 | 8/2006 | McGinty et al. | |
| 2007/0145956 | A1 | 6/2007 | Takeuchi | |
| 2008/0310196 | A1 | 12/2008 | Lin | |
| 2009/0174386 | A1 * | 7/2009 | Popescu et al. | 323/303 |
| 2010/0079122 | A1 | 4/2010 | Bodano et al. | |
| 2010/0165683 | A1 * | 7/2010 | Sugawara | 363/126 |
| 2011/0157940 | A1 | 6/2011 | Zhang | |
| 2011/0267856 | A1 * | 11/2011 | Pansier | 363/84 |

* cited by examiner

*Primary Examiner* — Nguyen Tran
(74) *Attorney, Agent, or Firm* — Blakely Sokoloff Taylor & Zafman LLP

(57) ABSTRACT

An example controller for use in a power supply includes a zero crossing detection (ZCD) circuit, a threshold detection circuit, and a punctuated switching control circuit. The ZCD circuit generates a ZCD signal that pulses each zero-crossing of an ac input voltage. The threshold detection circuit receives and compares an output of the power supply with a threshold reference. The punctuated switching control circuit generates a switching signal to control a switch to regulate the output of the power supply. The switching signal is generated to have intervals of switching and intervals of no switching, where each interval of switching begins responsive to the output of the power supply dropping below the threshold reference and each interval of no switching begins responsive to the output rising above the threshold reference. Each interval has a beginning that is synchronized with a pulse of the ZCD signal.

23 Claims, 10 Drawing Sheets

TL
TL/2
TL/2
VAC
122
0
VO
126
408
402
ZCD
SIGNAL
214
THRESHOLD
SIGNAL
218
DELAY
404
DELAY
406
SWITCHING
SIGNAL
218
INPUT
CURRENT
124
CURRENT
SENSE
AVERAGE
220
T0
T1 T2
T3
T4
T5
T6
INTERVAL OF
SWITCHING
INTERVAL OF NO
SWITCHING
INTERVAL OF
SWITCHING

CONTROLLER WITH PUNCTUATED SWITCHING CONTROL CIRCUIT

CROSS-REFERENCE TO RELATED APPLICATION

This application is a continuation of U.S. patent application Ser. No. 12/904,061, filed on Oct. 13, 2010, now pending. U.S. patent application Ser. No. 12/904,061 is hereby incorporated by reference.

TECHNICAL FIELD

This disclosure relates generally to power supplies, and in particular but not exclusively, relates to controllers for switched mode power supplies.

BACKGROUND INFORMATION

Electronic devices use power to operate. Switched mode power supplies are commonly used due to their high efficiency, small size and low weight to power many of today's electronics. Conventional wall sockets provide a low frequency alternating current. In a switching power supply an alternating current (ac) input is converted to provide a well regulated direct current (dc) output through high frequency (HF) switching and an energy transfer element, for example, an inductor or a transformer. The switched mode power supply controller usually provides output regulation by sensing the output and controlling it in a closed loop. In operation of a switched mode power supply the high frequency switching is utilized to provide the desired output by varying the on-time, off-time or switching frequency of the switch. Typically, in pulse width modulation PWM, duty cycle is controlled, where the duty cycle is the ratio of the on time to the total switching period.

Requirements, such as efficiency, size, weight and cost are usually taken into account when designing a switched mode power supply. A controller that controls the switching of the switched mode power supply may be designed to comply with efficiency requirements of certain regulatory agencies. For example, a conventional controller may be designed to control the switching of the switched mode power supply to reduce power consumption at no load or low load power conditions while at the same time be designed to increase efficiency at higher load conditions.

One method for reducing power loss at low load and no load conditions of the switched mode power supply is commonly known as "Burst Mode Control". With the conventional burst mode control methods, output regulation is provided by short intervals of narrow duty cycle switching pulses (i.e., "burst intervals") at low load or no load conditions. These burst intervals typically are configured to start once the output voltage drops below a lower value and to stop once the output rises above an upper value. Thus, the time at which the burst intervals start and stop with respect to the ac input voltage is random. This random starting and stopping of the burst intervals with respect to the ac input voltage may result in higher switching losses, lower efficiency, as well as increased EMI noise. In some cases, audible noise may even result.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
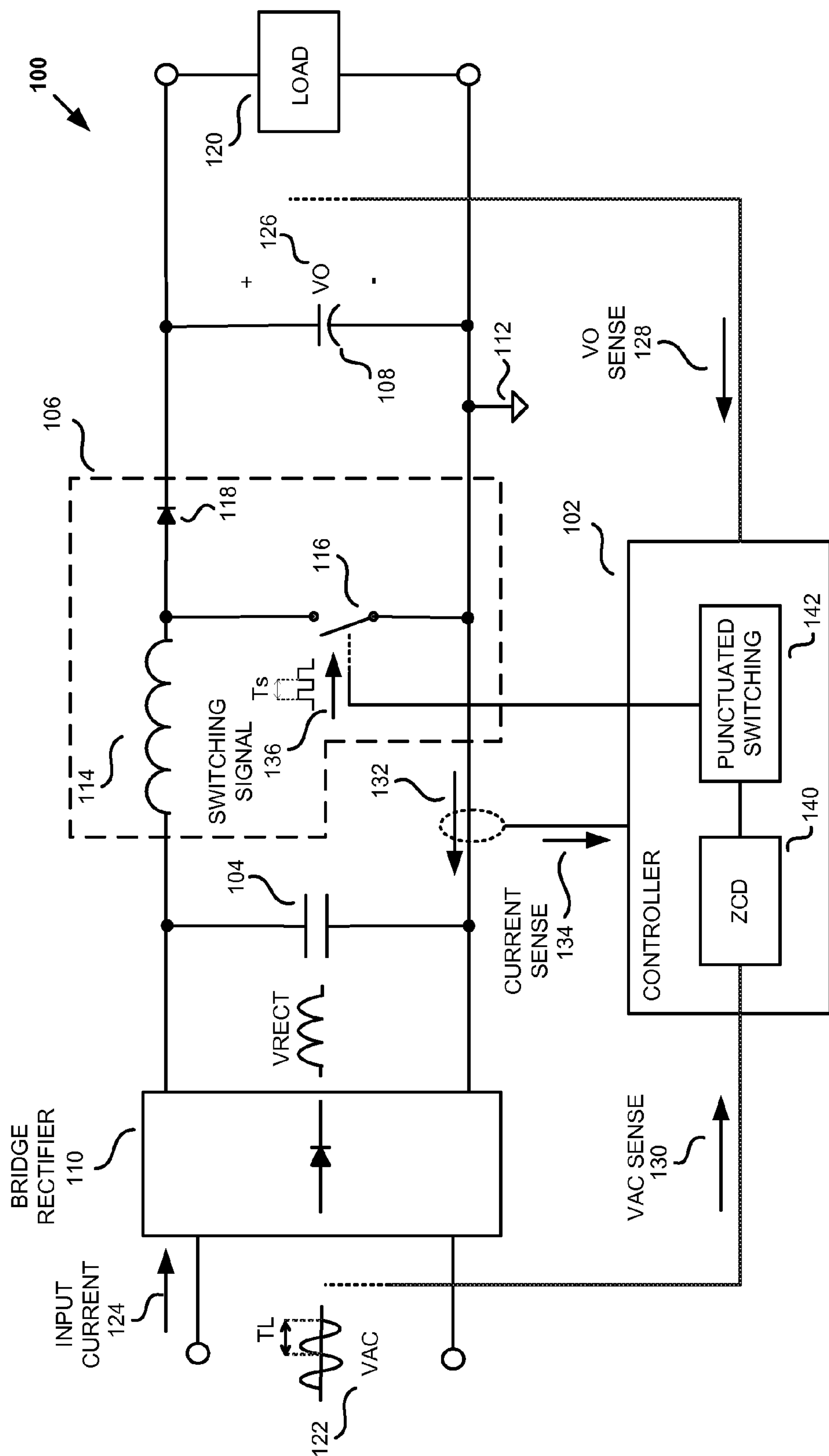
FIG. 1 is a functional block diagram illustrating an example switching power supply, in accordance with an embodiment of the invention.

Embodiments of an apparatus, system, and method for providing intervals of switching and intervals of no switching in a power supply that are synchronized with zero crossings of an ac input voltage are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As discussed above, conventional controllers may utilize burst intervals that start and stop at random times with respect to the ac input voltage, which may result in higher switching losses, lower efficiency, increased EMI noise, and even audible noise. Accordingly, in accordance with the teachings provided herein, embodiments of a controller and a power supply may include punctuated switching intervals that are synchronized with zero-crossings of the ac input voltage. The punctuated switching intervals may include intervals of switching and intervals of no switching, where each interval has a start and stop time that is determined not only by the output of the power supply but are also synchronized with the zero-crossing of the ac input voltage. In one embodiment, once the output voltage of the power supply drops below a threshold value, an interval of switching begins at the next zero-crossing of the ac input voltage. The interval of switching then may continue uninterruptedly until the output voltage rises above the threshold value, at which time the interval of switching continues until the next zero-crossing of the ac input voltage. Thus, the punctuated switching intervals discussed herein may be integer numbers of half line cycles (i.e., TL/2) of the ac input voltage. That is, since the start and stop times of the punctuated switching intervals are synchronized with the zero-crossings of the ac input voltage, each switching interval corresponds to an integer number of half line cycles of the ac input voltage. Also, in accordance with embodiments of the present invention, a power factor corrected (PFC) converter with punctuated switching control may have lower harmonic distortion and higher power factor because the sinusoidal input current only flows during the integer numbers of line half cycles of the ac input.

FIG. 1 is a functional block diagram illustrating an example switching power supply 100, in accordance with an embodiment of the invention. The illustrated example of switching power supply 100 in FIG. 1 includes a bridge rectifier 110, an input capacitor 104, a switching body 106, an output capacitor 108, a controller 102, and a common reference 112. However, in other embodiments switching power supply 100 does not include bridge rectifier 110 and may be referred to as a bridgeless PFC converter. The illustrated example of controller 102 includes a zero-crossing detection circuit 140 and a punctuated switching control circuit 142. Switching body 106 is illustrated as including an inductor 114, a switch 116 and an output rectifier 118. Also illustrated in FIG. 1 are load 120, ac input voltage 122, input current 124, output voltage 126, output voltage sense signal 128, input voltage sense signal 130, inductor current 132, current sense signal 134, and switching signal 136.

The switching power supply 100 may provide output power to the load 120 from an unregulated input voltage. In one example, the input voltage is the ac input voltage VAC 122. The ac input voltage VAC 122 may be an ac line voltage, such as may be provided from a conventional wall outlet. As shown in FIG. 1, bridge rectifier 110 receives the ac input voltage VAC 122 and produces a rectified voltage VRECT. Bridge rectifier 110 further couples to inductor 114 of switching body 106. In some embodiments of the present invention, switching body 106 may include an energy transfer element, such as a coupled inductor (not shown), a transformer (not shown), or the single inductor 114. Inductor 114 is further coupled to switch 116, which is then further coupled to common reference 112. In one embodiment, switch 116 may be a transistor such as a metal-oxide-semiconductor field-effect transistor (MOSFET).

Input capacitor 104 may couple across bridge rectifier 110 to filter high frequency current from switch 116. For other applications, input capacitor 104 may be large enough such that a dc voltage is applied to inductor 114. However for power supplies with power factor correction (PFC), input capacitor 104 having a small capacitance value may be utilized to allow the voltage applied to inductor 114 to substantially follow the rectified voltage VRECT. As such the value of the input capacitor 104 may be chosen such that the voltage on the input capacitor 104 reaches substantially zero during each half-line cycle of the ac input voltage VAC 122. Or in other words, the voltage on the input capacitor 104 substantially follows the positive magnitude of the ac input voltage VAC 122.

Inductor 114 is also shown in FIG. 1 as coupled to output rectifier 118. In the example of FIG. 1, rectifier 118 is exemplified as a diode. However, in some embodiments the rectifier 118 may be a transistor used as a synchronous rectifier. Both the output capacitor 108 and the load 120 are shown in FIG. 1 as being coupled to the rectifier 118. An output is provided to load 120 and may be provided as either a regulated output voltage VO 126, regulated output current IO (not shown), or a combination of the two. In one embodiment, switching power supply 100 is a voltage follower where the output provided to load 120 follows an input level of the power supply.

Switched mode power supply 100 further comprises circuitry to regulate the output. A feedback circuit (not shown) may be coupled to sense the output (e.g., output voltage VO 126) of switched mode power supply 100 and produce a feedback signal (e.g., output voltage sense signal VO SENSE 128). In one embodiment, output voltage sense signal VO SENSE 128 is representative of the output voltage 126. The output voltage sense signal VO SENSE 128 may be a current signal or a voltage signal. It is recognized that a voltage signal and current signal each may contain both a voltage component and a current component. However, the term "voltage signal" as used herein means that the voltage component of the signal is representative of the relevant information. Similarly, the term "current signal" as used herein means that the current component of the signal is representative of the relevant information. By way of example, output voltage sense signal VO SENSE 128 may be a current signal having a voltage component and a current component, where it is the current component that is representative of output voltage VO 126.

In some embodiments, output voltage sense signal VO SENSE 128 may be derived from sensing one or more quantities on the input side of switching body 106; in one embodiment by sensing the peak voltage on the high voltage side of the switch, in an example, the MOSFET drain voltage, as a representative of the output. As shown, Controller 102 includes a terminal for receiving the output voltage sense signal VO SENSE 128, a terminal for receiving input voltage sense signal VAC SENSE 130, and a terminal for receiving current sense signal 134. The current sense signal 134 may be representative of inductor current (i.e., current flowing through inductor 114), while input voltage sense signal VAC SENSE may be representative of ac input voltage VAC 122.

Due to the non-linear loading that conventional switching power supplies may present to the ac source, the wave shape of the current drawn from the ac source by the power supply may be non-sinusoidal and/or out of phase with the ac input voltage waveform. This leads to increased losses in the ac mains distribution system and, in many parts of the world, is now the subject of legislative or voluntary requirements that power supply manufacturers ensure the current drawn by the power supply is substantially sinusoidal and in phase with the ac voltage waveform. Thus, embodiments disclosed herein may provide for the correction of the input current waveform. Such a correction is commonly referred to as power factor correction (PFC). In general, if the input ac current and voltage waveforms are sinusoidal and perfectly in phase, the power factor of the power supply 100 is 1. In other words, a power factor corrected input will present a load to the ac source that is equivalent to coupling a resistance across the ac source. As harmonic distortion and/or phase displacement of the input current relative to the ac source voltage increase, the power factor decreases below 1. Power factor requirements typically require power factors greater than 0.9 and may have requirements for the harmonic content of the input current waveform. In one embodiment, controller 102 provides power factor correction is response to the ac input voltage signal VAC 130 and current sense signal 134. In another embodiment controller 102 may provide PFC in response to the ac input current 124 and the output voltage VO 126.

FIG. 1 further illustrates controller 102 as generating switching signal 136 to control the switching of switch 116 to regulate the output of switching power supply 100. As will be discussed further, switching signal 136 includes intervals of switching and intervals of no switching, where at least the interval of switching has a beginning that is synchronized with a zero-crossing of ac input voltage VAC 122. In the illustrated example, the zero-crossings of ac input voltage VAC 122 are detected by zero-crossing detector circuit 140. In one embodiment, each interval of switching may include a plurality of switching periods $T_S$. Each switching period $T_S$ may include a logic high and logic low value, with the logic high value corresponding to a closed switch and a logic low value corresponding to an open switch.

In one embodiment, punctuated switching control circuit 142 of controller 102 provides switching signal 136 with intervals of switching and intervals of no switching for all load conditions at the output of switching power supply 100. In another embodiment, controller includes a first mode of operation for low and no load conditions and a second mode for higher load conditions. The first mode of operation at low load and no load conditions includes generating switching signal 136 having the intervals of switching and intervals of no switching that are synchronized with the zero-crossing of the ac input voltage VAC 122. The second mode of operation may be activated by controller 102 upon detection of a higher load condition at the output and may include generating switching signal 136 without the synchronized intervals as in the first mode, by a conventional method of regulating the output such as ON/OFF control, duty ratio control, et cetera.

In one example, controller 102 may be implemented as a monolithic integrated circuit or may be implemented with discrete electrical components or a combination of discrete and integrated components. Controller 102 and switch 116 could form part of an integrated circuit that is manufactured as either a hybrid or monolithic integrated circuit.

Figure 2:
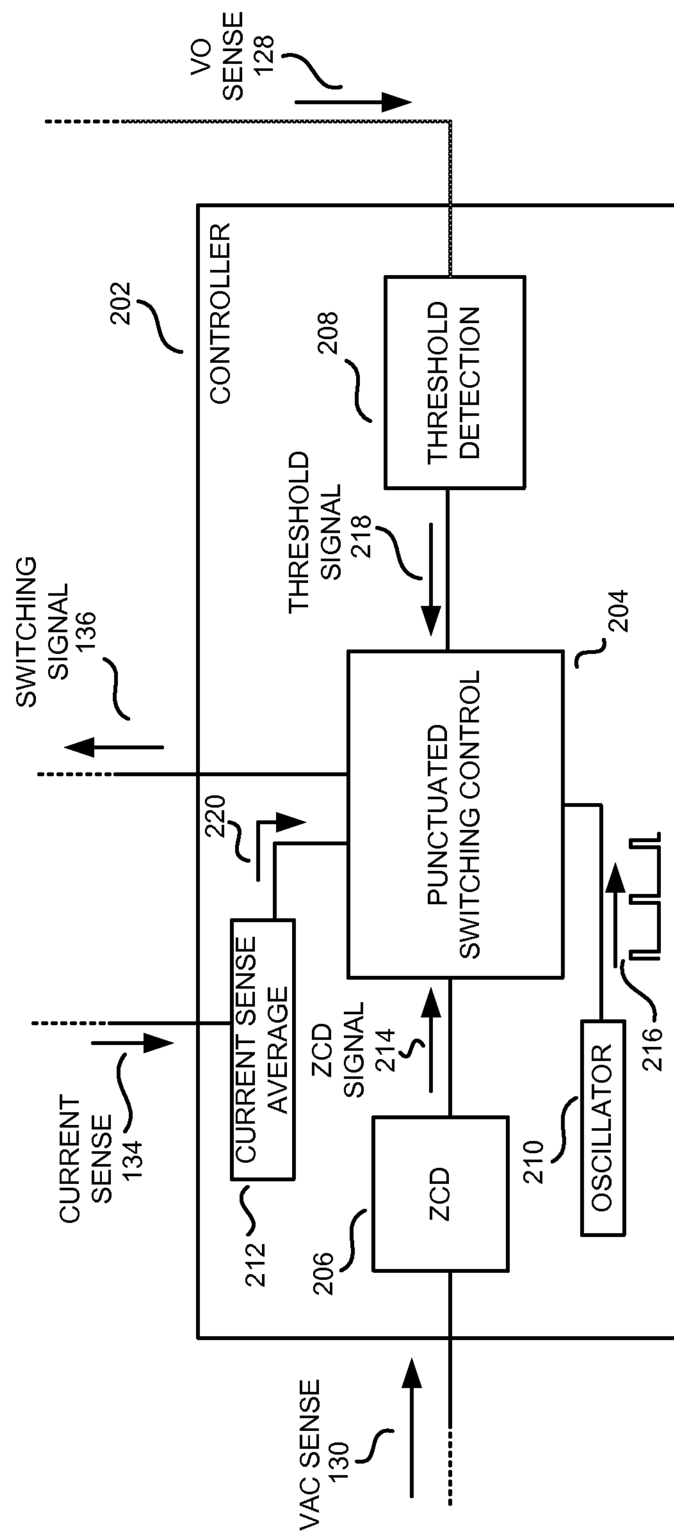
FIG. 2 is a functional block diagram illustrating an example controller, in accordance with an embodiment of the invention.

FIG. 2 is a functional block diagram illustrating an example controller 202, in accordance with an embodiment of the invention. The illustrated example of controller 202 includes a punctuated switching control circuit 204, a zero-crossing detection (ZCD) circuit 206, a threshold detection circuit 208, an oscillator 210, and a current sense average circuit 212. Also illustrated in FIG. 2 are zero-crossing detection (ZCD) signal 214, clock signal 216, threshold signal 218, and averaged current sense signal 220. Controller 202 is one possible implementation of controller 102 of FIG. 1.

As shown in FIG. 2, ZCD circuit 210 is coupled to receive input voltage sense signal 130, which in one example is representative of ac input voltage VAC 122 (see FIG. 1). However, in other embodiments zero crossing could be detected by other methods, for example, by sensing and processing the input rectified voltage VRECT; by taking the derivative of the output voltage VO 126 or may also be derived, in the case of an off-time controller, from internal signals of the punctuated switching control circuit 142 and during the non-switching interval may be approximated with a counter to project when the zero-crossing occurs. The ZCD circuit 210 is further coupled to provide ZCD signal 214 to the punctuated switching control circuit 204. In one example, ZCD signal 214 is a pulsing signal, where each pulse corresponds to a zero-crossing of the ac input voltage VAC 122. Punctuated switching control circuit 204 is also coupled to receive clock signal 216 from oscillator 210. In one example, each switching period $T_S$ included in the intervals of switching of switching signal 136 are substantially equal to or a multiple of the cyclical period of clock signal 216. In other words, a switching frequency of switching signal 136 during the intervals of switching may be equal to or less than the frequency of clock signal 216.

FIG. 2 further illustrates threshold detection circuit 208 as being coupled to receive a feedback signal, such as, output voltage sense signal VO SENSE 128, which in one example, is representative of output voltage VO 126 (see FIG. 1). In one embodiment, threshold detection circuit 208 provides the threshold signal 218 to punctuated switching control circuit 204 to indicate the magnitude of the output voltage VO 126 relative to one or more threshold references. For example, threshold detection circuit 208 may include a single threshold reference, where the threshold signal 218 indicates whether the output voltage VO 126 is above or below the single threshold reference. In another example, threshold detection circuit 208 may include two threshold references, an upper threshold reference and a lower threshold reference. In this example, threshold signal 218 may indicate whether the output voltage VO 126 is above the upper threshold reference and whether output voltage VO 126 is below the lower threshold reference.

Current sense average circuit 212 is coupled to receive current sense signal 134, which in one example is representative of inductor current 132 (see FIG. 1). Current sense average circuit 212 is further coupled to average the current sense signal 134 and to provide punctuated switching control circuit 204 with an averaged current sense signal 220, which in one example is representative of the average inductor current (i.e., average of current flowing through inductor 114 of FIG. 1). In one embodiment, during continuous conduction mode (CCM) of operation, current sense average circuit 212 may average the inductor current by filtering out high frequency current pulses that may result from the switching of switch 116 at each switching period $T_S$ or in another embodiment, by integrating pulses in current 132 over switching cycle Ts or when the switch 116 is closed or when the switch 116 is open.

Figure 3:
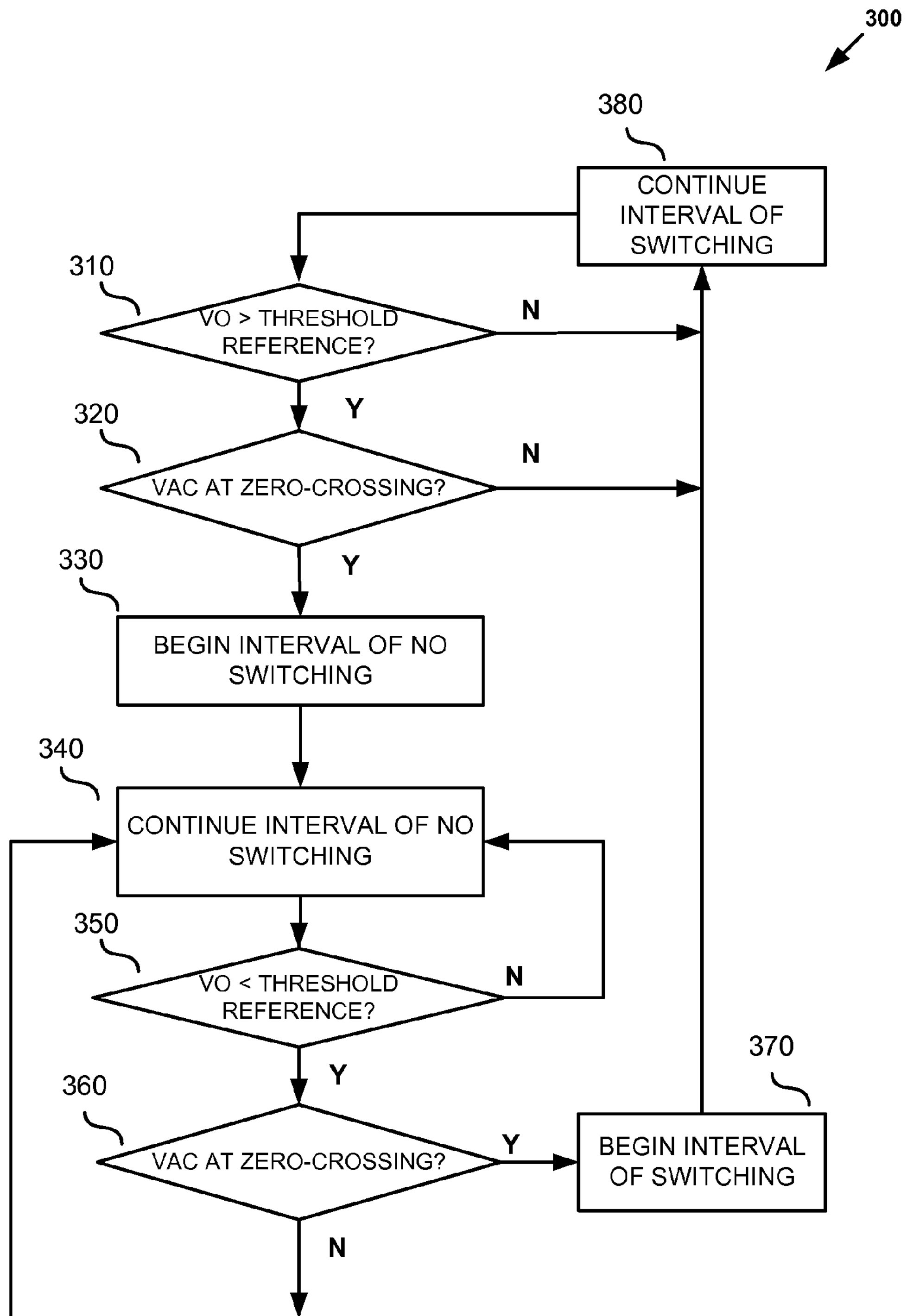
FIG. 3 is a flowchart illustrating a process of changing between intervals of switching and intervals of no switching in operation of the power supply of FIG. 1 and the controller of FIG. 2.
Figure 4:
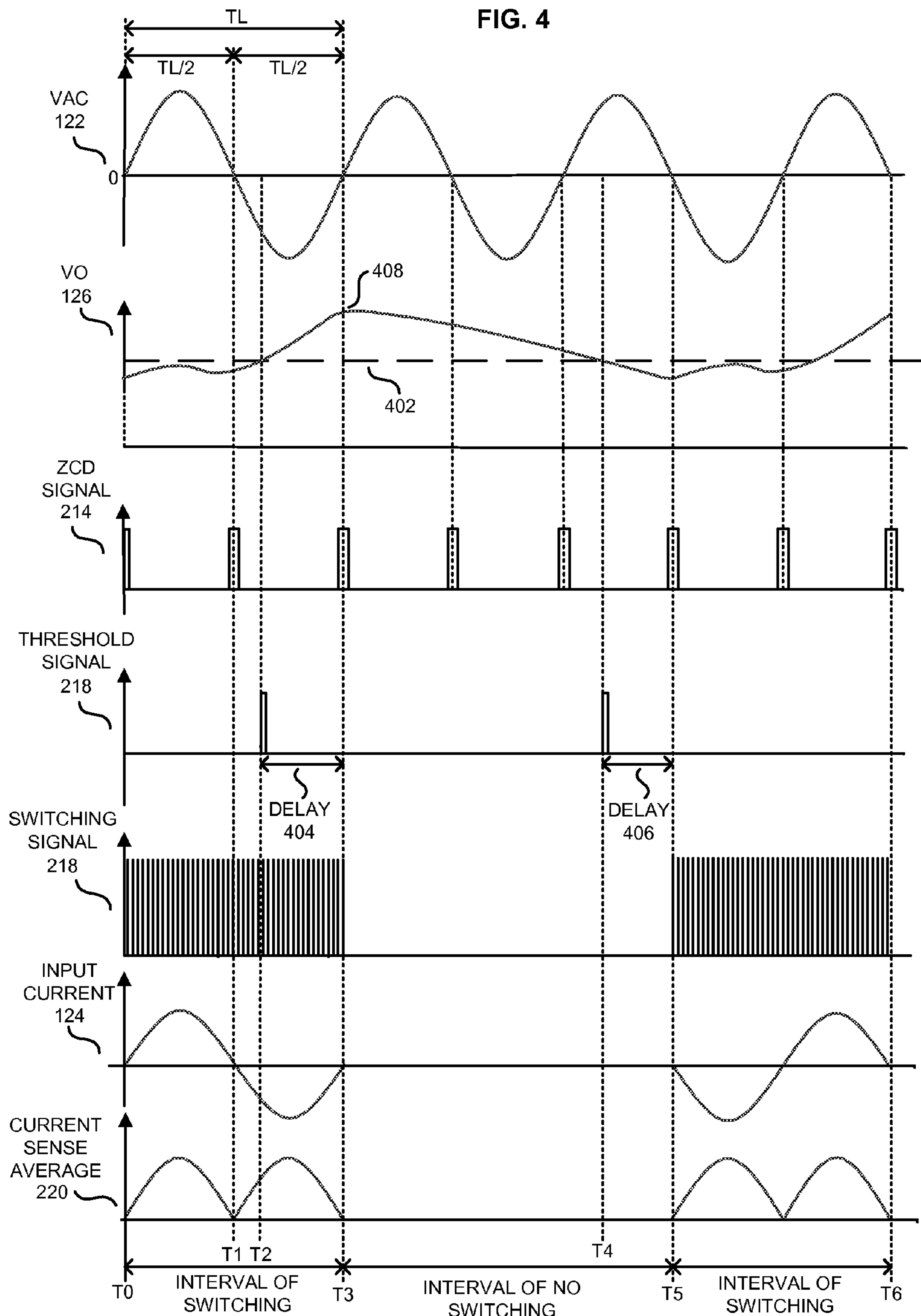
FIG. 4 is a diagram illustrating example waveforms of the power supply of FIG. 1 and of the controller of FIG. 2.

The operation of controller 202 will now be described with reference to FIGS. 1-4, where FIG. 3 illustrates a process 300 of operation and FIG. 4 illustrates several example waveforms. Assuming that punctuated switching control circuit 204 is presently in an interval of switching (i.e., see time period T0 through T3 of FIG. 4), the process begins at decision block 310, where a feedback circuit (not shown) senses the output voltage VO 126 and provides the output voltage sense signal VO SENSE 128 to controller 202. In response thereto, the threshold detection circuit 208 then determines whether the output voltage VO 126 is greater than a threshold reference 402. As shown in FIG. 4, at times T0 and T1, output voltage VO 126 is less than threshold reference 402. Thus, process 300 proceeds to process block 380 where controller 202 continues the interval of switching. In one embodiment, the interval of switching extends for multiple switching periods $T_S$, where switch 116 is uninterruptedly switched on and off for the entire interval. Subsequently, as can be seen in FIG. 4 at time T2, the output voltage VO 126 crosses the threshold reference 402. Next in a decision block 320, at time T2, a determination is made as to whether the ac input voltage VAC 122 is at a zero-crossing. FIG. 4 illustrates one example of ZCD signal 214 that is generated by ZCD circuit 206 in response to the input voltage sense signal 130. As shown, ZCD signal 214 may pulse at each zero-crossing of ac input voltage VAC 122. Thus, punctuated switching control circuit 204 may determine whether the ac input voltage VAC 122 is at a zero-crossing in response to ZCD signal 214. However, at time T2, ac input voltage VAC 122 is not at a zero-crossing. Thus, punctuated switching control circuit 204 may delay the ending of the interval of switching (i.e., the beginning of the interval of no switching) until the next zero-crossing of ac input voltage VAC 122. For example, process 300 proceeds to process block 380 to continue the interval of switching until the next zero-crossing is reached. As can be seen in FIG. 4, waiting until the next zero-crossing imparts a delay 404 between the time the threshold reference 402 is reached (i.e., time T2) and the time of the end of the interval of switching (i.e., time T3). During delay 404, punctuated switching control circuit 204 may continue switching switch 116 for a plurality of switching cycles. Thus, switch 116 may continue to turn on and off multiple times even after output voltage VO 126 has risen above threshold reference 402.

At time T3, a zero-crossing of ac input voltage VAC 122 is reached, as indicated by the pulse of ZCD signal 214 at time T3. At time T3, process 300 proceeds to process block 330 where punctuated switching control circuit 204 begins the interval of no switching, thus synchronizing the beginning of the interval of no switching with the zero-crossing of ac input voltage VAC 122. In one embodiment, the end of an interval of switching is the beginning of an interval of no switching. Similarly, the beginning of an interval of switching is the end of an interval of no switching. In one embodiment, the interval of no switching extends for multiple clock cycles of clock signal 216, where switch 116 remains open (i.e., off) continuously for the entire interval.

Still referring to process 300, process block 340 continues the interval of no switching and in a decision block 350, threshold detection circuit 208 determines whether the output voltage VO 126 is less than the threshold reference 402. If not, process 300 returns to process block 340 to continue the interval of no switching. As shown in FIG. 4, output voltage VO 126 crosses the threshold reference 402 (i.e., VO<threshold reference) at time T4. Thus, process 300 proceeds to a decision block 360, where a determination is made as to whether the ac input voltage VAC 122 is at a zero-crossing. However, at time T4, ac input voltage VAC 122 is not at a zero-crossing. Thus, punctuated switching control circuit 204 may delay the ending of the interval of no switching (i.e., the beginning of the next interval of switching) until the next zero-crossing of ac input voltage VAC 122. For example, process 300 returns to process block 340 to continue the interval of no switching until the next zero-crossing at time T5. As can be seen in FIG. 4, waiting until the next zero-crossing imparts a delay 406 between the time the threshold reference 402 is reached (i.e., time T4) and the time of the end of the interval of no switching (i.e., time T5). During delay 406, punctuated switching control circuit 204 may continue disabling switch 116 (keeping switch 116 off) for a plurality of clock cycles of clock signal 216. Thus, switch 116 may uninterruptedly be disabled for several clock cycles even after output voltage VO 126 drops below threshold reference 402.

The two delay times 404 and 406 together ensure that the interval of switching as well the interval of no switching are both integer number of half-line cycles of the input voltage. For example, the length of the first interval of switching (i.e., T0-T3) illustrated in FIG. 4 is equal to two half-line cycles TL/2 of ac input voltage VAC 122 and the length of the interval of no switching (i.e., T3-T5) illustrated in FIG. 4 is equal to three half-line cycles TL/2 of ac input voltage VAC 122.

At time T5, the next zero-crossing of ac input voltage VAC 122 is reached, as indicated by the pulse of ZCD signal 214 at time T5. Thus, process 300 proceeds to process block 370 where punctuated switching control circuit 204 begins the next interval of switching.

Figure 5:
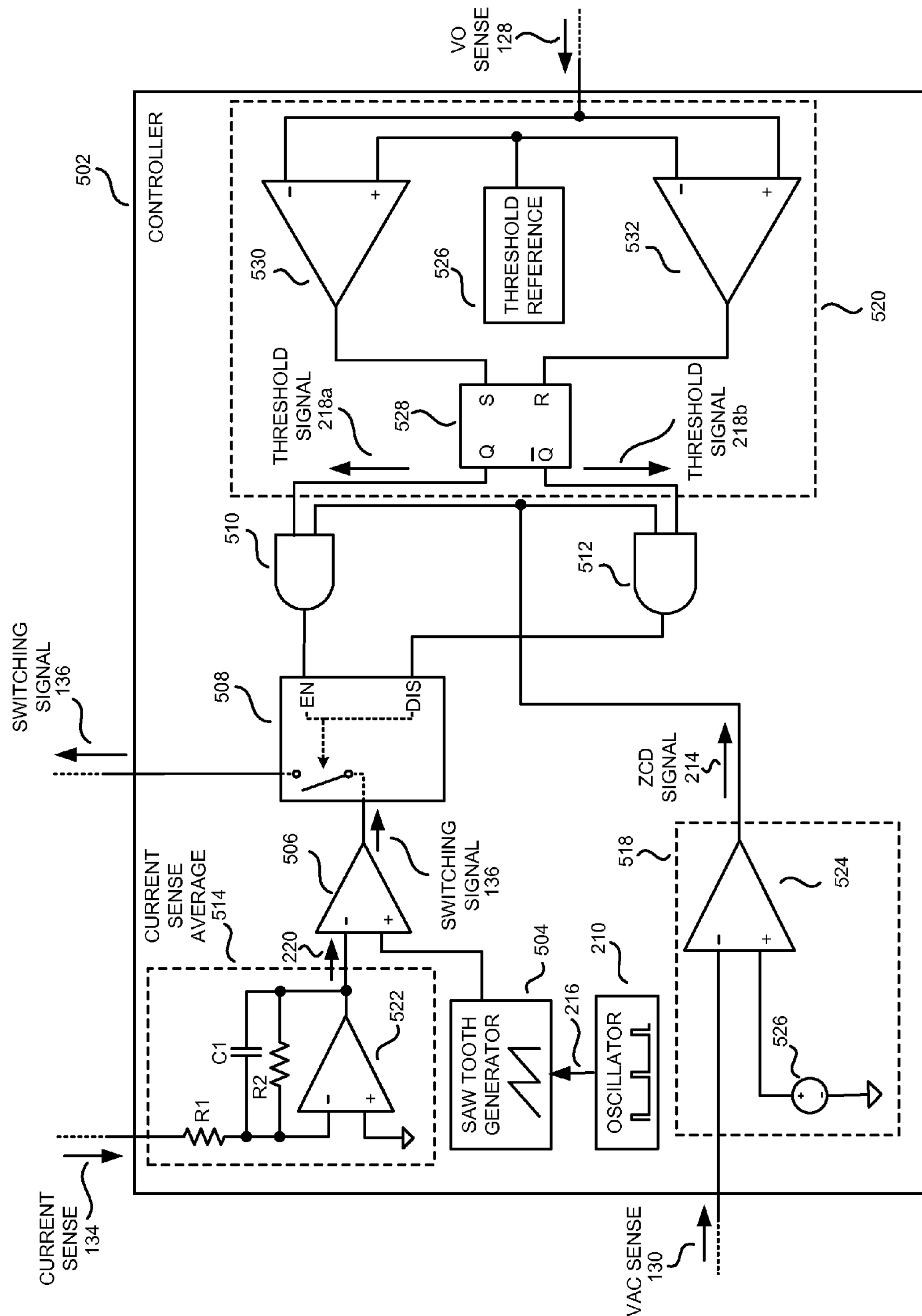
FIG. 5 is a functional block diagram illustrating an example controller, in accordance with an embodiment of the invention.

FIG. 5 is a functional block diagram illustrating an example controller 502, in accordance with an embodiment of the invention. Controller 502 is one possible implementation of controller 102 of FIG. 1 or of controller 202 of FIG. 2. The illustrated example of controller 502 has a punctuated switching control circuit that includes a saw tooth generator 504, a switching signal generator (e.g., comparator 506), an interval generator 508, and logic gates 510 and 512. Also included in the illustrated example of controller 502, are a current sense average circuit 514, oscillator 216, a zero-crossing detection (ZCD) circuit 518, and a threshold detection circuit 520. Current sense average circuit 514 is shown in FIG. 5 as including an amplifier 522, resistors R1 and R2, and a capacitor C1. Current sense average circuit 514 is one possible implementation of current sense average circuit 212 of FIG. 2. ZCD circuit 518 is illustrated as including a comparator 524 and a zero-crossing reference 526. ZCD circuit 518 is one possible implementation of ZCD circuit 206 of FIG. 2. Threshold detection circuit 520 is illustrated as including a threshold reference 526, a latch 528, and comparators 530 and 532. Threshold detection circuit 520 is one possible implementation of threshold detection circuit 208 of FIG. 2.

Controller 502 functions and couples similar to controller 202 of FIG. 2. For example, ZCD circuit 518 is coupled to generate ZCD signal 214 in response to the input voltage sense signal VAC SENSE 130. In one embodiment, input voltage sense signal VAC SENSE 130 is representative of the magnitude of ac input voltage VAC 122. Thus, ZCD circuit 518 may include comparator 524 to compare the input voltage sense signal VAC SENSE 130 to a threshold reference voltage 526. That is, ZCD signal 214 may pulse whenever the magnitude of the ac input voltage VAC 122 is less than the threshold reference voltage 526. Accordingly, in one example, the pulses of ZCD signal 214 may be centered about the zero-crossing of ac input signal VAC 122. In one embodiment, the threshold reference voltage 526 is representative of an instantaneous ac input voltage of less than 1 volt.

As shown in FIG. 5, controller 502 further includes a current sense average circuit 514 coupled to provide a current sense averaged over switching cycle Ts depicted as signal 220 in response to the current sense signal 134. In one embodiment, current sense average signal 220 is representative of the low frequency rectified (120 Hz) current flowing through inductor 114 (see also FIG. 4, signal 220). In one example, current sense average circuit 514 includes an amplifier 522 having a gain circuit of capacitor C1, resistor R1 and resistor R2.

Comparator 506 is coupled to compare the current sense average signal 220 with a variable reference value and to generate switching signal 136 in response thereto. For example, saw tooth generator 504 is coupled to provide comparator 506 with a variable reference value in the form of a saw tooth waveform that is responsive to the clock signal output from oscillator 210. In one embodiment, the variable reference value provided to comparator 506 may be a ramp waveform rather than the saw tooth waveform illustrated in FIG. 5. Accordingly, comparator 506 may output switching signal 136 having a fixed frequency equal to the frequency of clock signal 216 and variable duty ratio responsive to inductor current 132 (see FIG. 1).

Also illustrated in FIG. 5 is threshold detection circuit 520. Threshold detection circuit 520 is coupled to receive output voltage sense signal VO SENSE 128 and to generate at least one threshold signal in response thereto. For example, threshold detection circuit 520 is coupled to generate two threshold signals 218*a* and 218*b*. In the illustrated example, threshold signal 218*a* is a logic high value in response to output voltage VO 126 being below the threshold reference 402 (see FIG. 4) and threshold signal 218*b* is a logic high value in response to the output voltage VO 126 being above the threshold reference 402. As shown, threshold detection circuit 520 includes threshold reference circuit 526 to provide the threshold reference 402 to comparators 530 and 532. Comparators 530 and 532 are coupled to respective set and reset inputs of latch 528.

Logic gates 510 and 512 are coupled to enable and disable the interval generator 508 in response to the ZCD signal 214 and in response to threshold signal 218*a* and 218*b*. In operation, logic gate 510 enables interval generator 508 in response to threshold signal 218*a* indicating that the output voltage VO 126 is less than the threshold reference and in response to ZCD signal 214 indicating a zero-crossing of ac input voltage VAC 122. The enabling of interval generator 508 marks the beginning of the interval of switching, such that switching signal 136 is allowed to pass through interval generator 508 uninterrupted until interval generator 508 is subsequently disabled.

Logic gate 512 disables interval generator 508 in response to threshold signal 218*b* indicating that the output voltage VO 126 is greater than the threshold reference and in response to ZCD signal 214 indicating a zero-crossing of ac input voltage VAC 122. The disabling of interval generator 508 marks the beginning of the interval of no switching, such that switching signal 136 is not allowed to pass through interval generator 508. Switching signal 136 is thus disabled until interval generator 508 is subsequently enabled.

Figure 6:
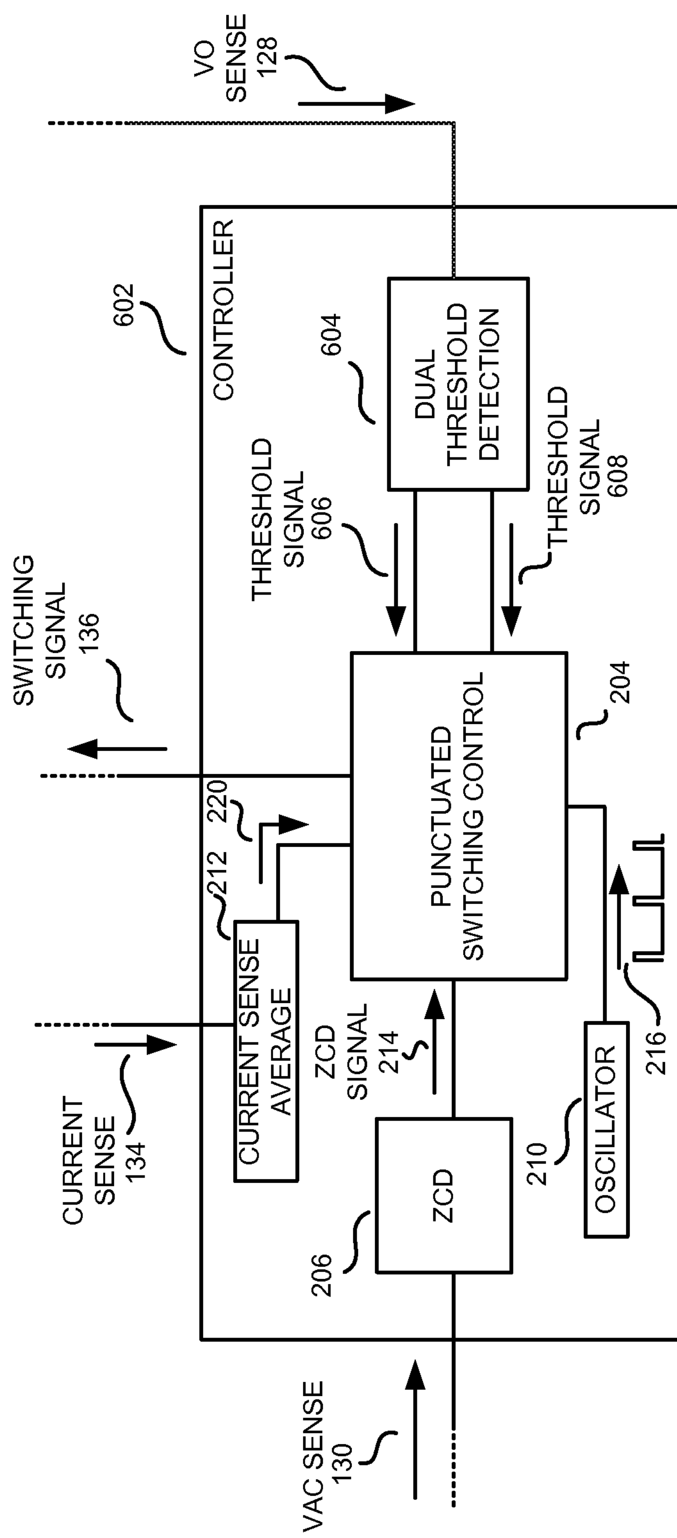
FIG. 6 is a functional block diagram illustrating an example controller utilizing dual threshold detection, in accordance with an embodiment of the invention.
Figure 7:
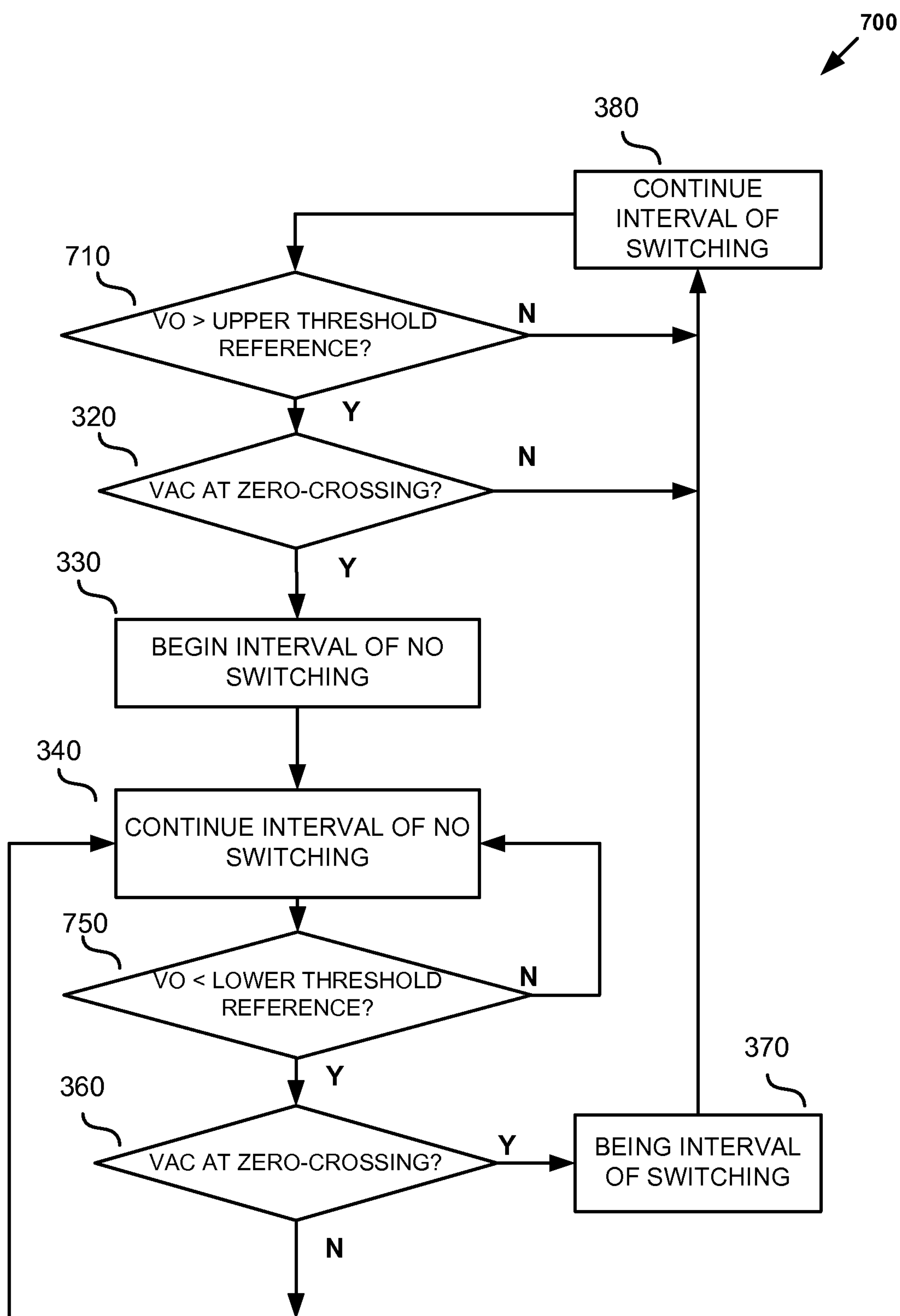
FIG. 7 is a flowchart illustrating a process of changing between intervals of switching and intervals of no switching in operation of the controller of FIG. 6.

FIG. 6 is a functional block diagram illustrating an example controller 602 utilizing a dual threshold detection circuit 604, in accordance with an embodiment of the invention. Controller 602 is one possible implementation of controller 202 of FIG. 2. In fact, controller 602 couples and functions similarly to controller 202 except that controller 602 includes threshold detection circuit 604 that utilizes two threshold references, an upper threshold reference and a lower threshold reference. In this example, threshold signal 606 may indicate whether the output voltage VO 126 is above the upper threshold reference and threshold signal 608 may indicated whether output voltage VO 126 is below the lower threshold reference. FIG. 7 illustrates a process 700 of operating of controller 602 of FIG. 6. Process 700 is similar to process 300 of FIG. 3, except for at decision blocks 710 and 750 which utilize two separate threshold references (i.e., upper threshold reference and lower threshold reference) rather than the single threshold reference of FIG. 3.

Figure 8:
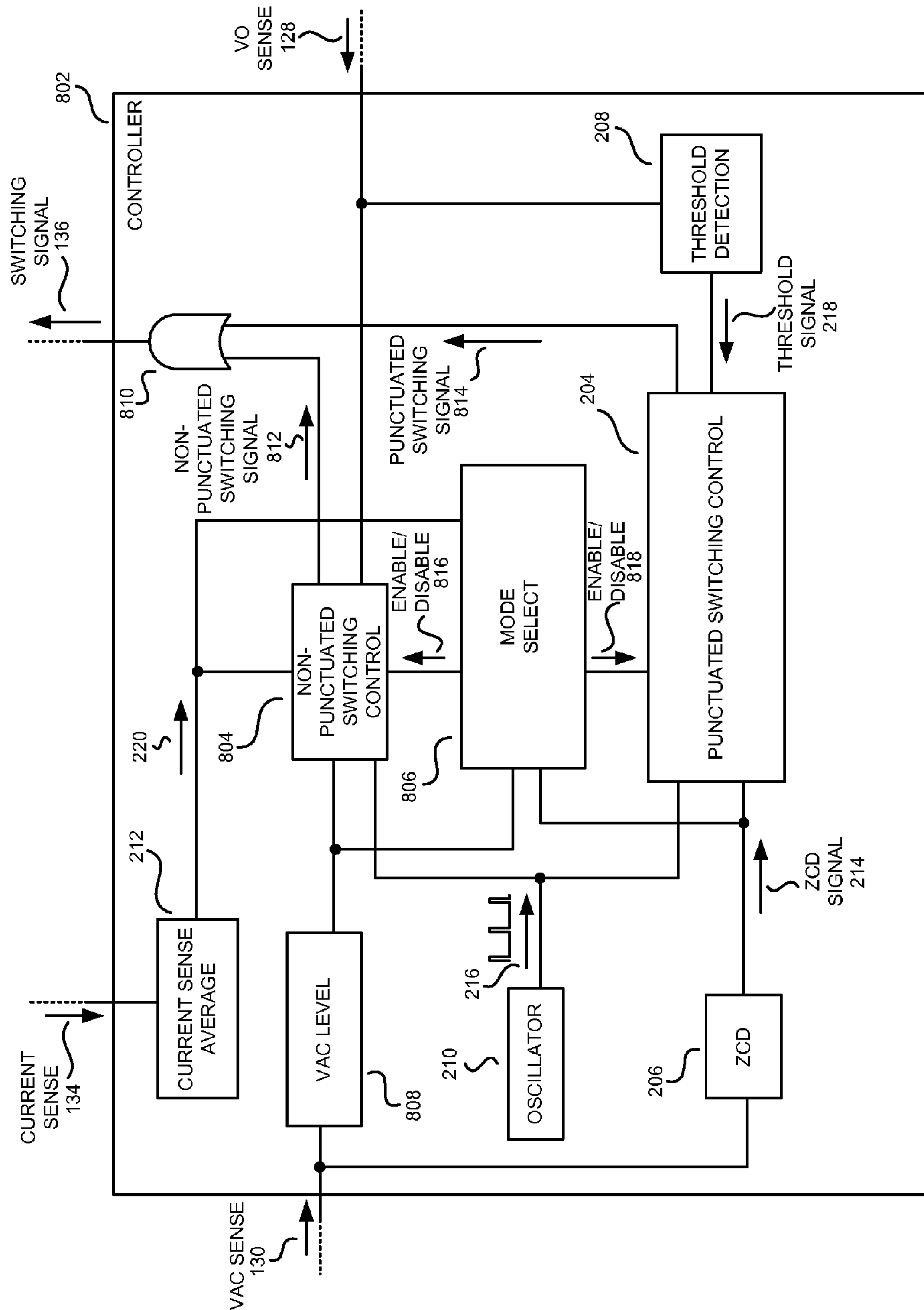
FIG. 8 is a functional block diagram illustrating an example controller having a punctuated switching control circuit and a non-punctuated switching control circuit, in accordance with an embodiment of the invention.

FIG. 8 is a functional block diagram illustrating an example controller 802 having punctuated switching control circuit 204 and a non-punctuated switching control circuit 804, in accordance with an embodiment of the invention. Also shown as included in controller 802 are mode select circuit 806, ac voltage detection circuit 808, and logic gate 810. Controller 802 is one possible implementation of controller 102 of FIG. 1. As discussed above with reference to FIG. 1, embodiments of controllers disclosed herein may include multiple modes of operation: one mode for no/low load conditions and another mode for higher load conditions. As such, controller 802 includes mode select circuit 806 to switch modes of operation by selectively enabling and disabling punctuated switching control circuit 204 and non-punctuated switching control circuit 804. The illustrated example of non-punctuated switching control circuit 804 generates non-punctuated switching signal 812 without the synchronized intervals as is done with the punctuated switching control circuit 204. Instead, non-punctuated switching control circuit 804 may generate switching signal 812 by known methods of regulating the output such as ON/OFF control, duty ratio control, etc.

As is further shown in FIG. 8, controller 802 includes the ac voltage level detection circuit 808 coupled to provide an output representative of a level of the ac input voltage VAC 122 in response to the input voltage sense signal VAC SENSE 130. In one example, ac voltage level detection circuit 808 detects and outputs a signal representative of a peak value of the ac input voltage VAC 122. In another embodiment, ac voltage level detection circuit 808 may detect and output a signal representative of an average value of the ac input voltage VAC 122.

For low and no load conditions, mode select circuit 806 is coupled to enable punctuated switching control circuit 204 and, at the same time, disable non-punctuated switching control circuit 804. In an embodiment the mode transfer happens at the first ZCD after sensing the low load level threshold. By way of example, a low load condition may correspond to an output power that is less than 10-20% of a maximum output power for the power supply. For higher load conditions, mode select circuit 806 is coupled to enable non-punctuated switching control circuit 804 and, at the same time, disable punctuated switching control circuit 204. Thus, whenever one of the switching control circuits is enabled the other is disabled so that logic circuit 810 only receives one active switching signal at a time. In other words, switching signal 136 output by controller 802 is representative of punctuated switching signal 814 for low and no load conditions and is representative of non-punctuated switching signal 812 for higher load conditions. In the illustrated embodiment, mode select circuit 806 is coupled to determine the load condition at the output of the power supply by determining the input power. For example, mode select circuit 806 may determine the input power responsive to the ac input voltage VAC 122 and inductor current 132 (see FIG. 1). In one embodiment, mode select circuit 806 multiplies an input voltage level with a level of the inductor current (e.g., multiplying peak or average values of ac input voltage VAC 122 and current sense average signal 220) to determine the input power.

Figure 9A:
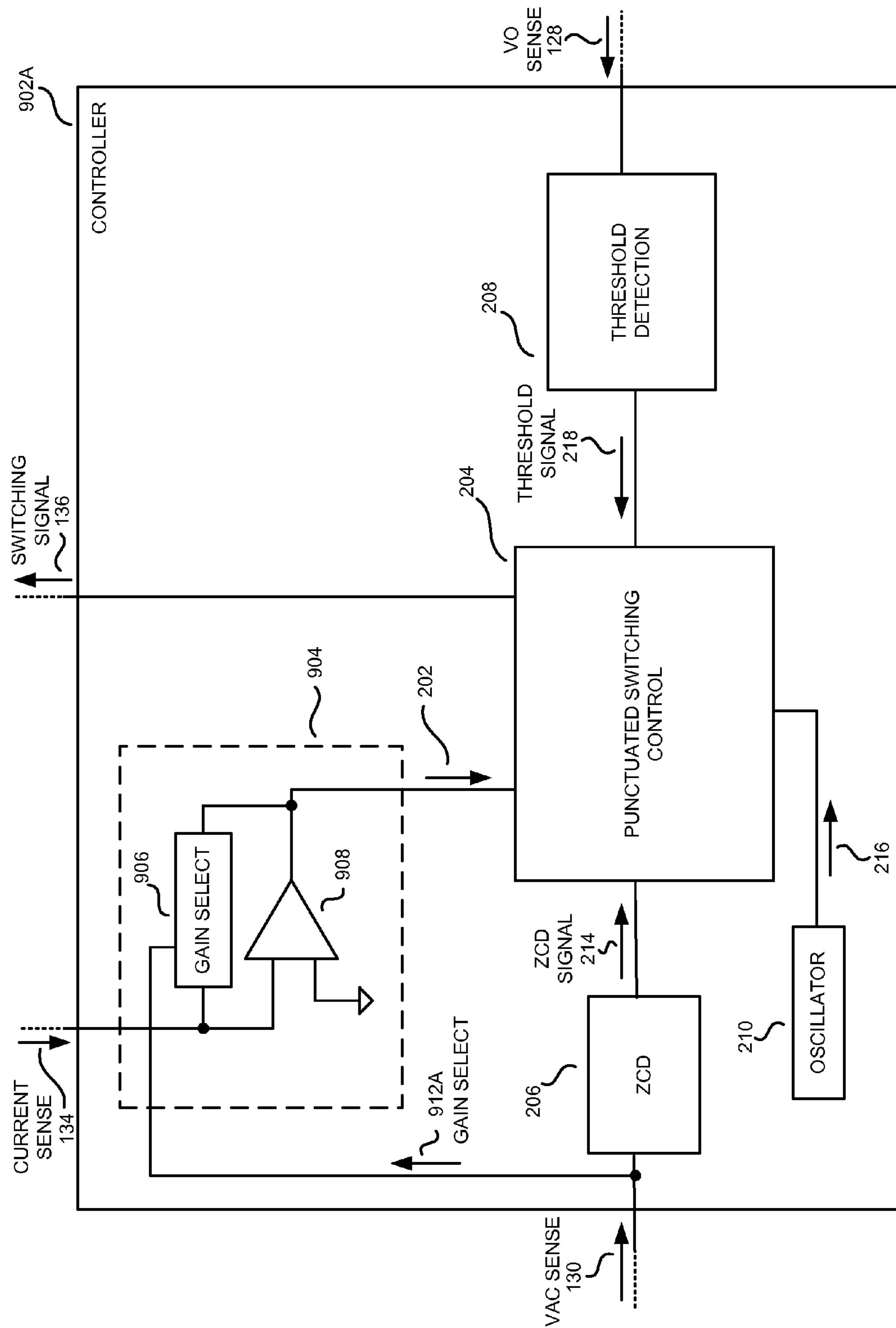
FIG. 9A is a functional block diagram illustrating an example controller having a current sense average circuit that includes a selectable gain, in accordance with an embodiment of the invention.

FIG. 9A is a functional block diagram illustrating an example controller 902A having a current sense average circuit 904 that includes a gain select circuit 906 and an amplifier 908, in accordance with an embodiment of the invention. Controller 902*a* is one possible implementation of controller 102 of FIG. 1.

Figure 9B:
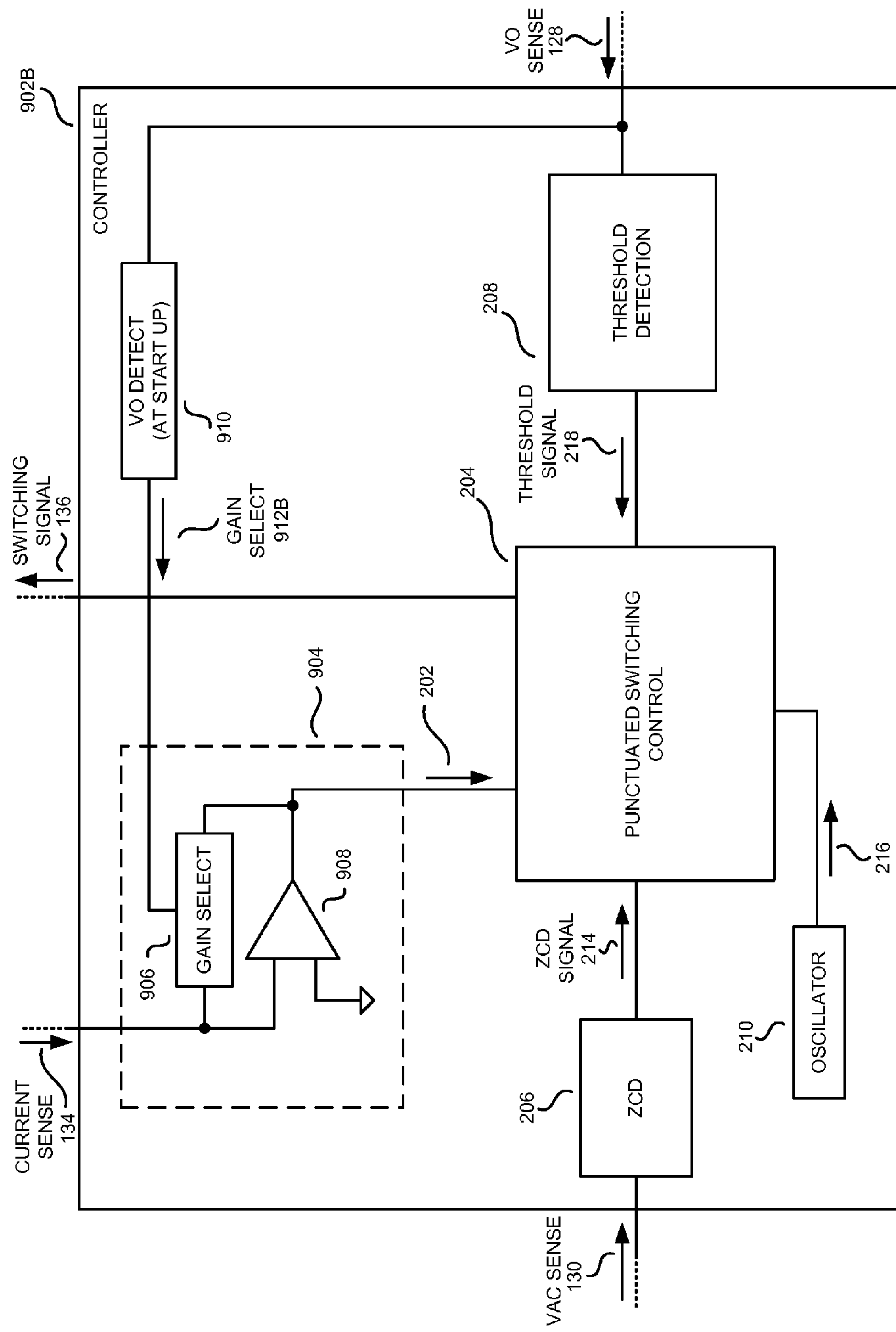
FIG. 9B is a functional block diagram illustrating another example controller having a current sense average circuit that includes a selectable gain, in accordance with an embodiment of the invention.

In one embodiment, controller 902A is for use in a boost PFC power supply having a universal input voltage range (e.g., 90 Vac to 265 Vac). However, for a universal input boost power supply design, the current loop gain and the effective input resistance of the power supply may need to be set for the lowest line input voltage (e.g., 90 Vac) in order to deliver the maximum power at the output. When the line input voltage increases to higher values and towards the maximum value, the fixed value of the effective input resistance, may cause an overshoot in the output voltage. For example, referring back to FIG. 4, it is noted that when output voltage VO 126 reaches threshold reference 402, such as at time T2, the output voltage VO 126 continues to rise until the next zero-crossing at time T3. This "overshoot" (element 408) is due in part to delay 404 and the continued switching of switching signal 136. Accordingly, controller 902A includes gain select circuit 906 coupled to provide a selectable gain to amplifier 908 to compensate for varying peak values of the ac input voltage VAC 122. In one example, gain select circuit 906 is coupled to maintain an effective input resistance of the power supply that is inversely proportional to a peak value of the ac input voltage. In FIG. 9A the input voltage signal VAC 122 is coupled to the gain select circuit 906 to select gain in response to the input voltage level (e.g., gain select signal 912A). In another embodiment depicted in FIG. 9B, an output detection circuit 910 is coupled to detect the output voltage VO 126 at the start-up of power supply (e.g., power supply 100). In the example of FIG. 9B, the output voltage VO 126 at the start-up of the power supply is representative of the peak value of the ac input voltage VAC 122. Thus, output voltage detection circuit 910 may generate a gain select signal 912B to select the appropriate gain of gain select circuit 906 responsive to a peak value of the ac input voltage VAC 122. In one example, output voltage detection circuit increases the gain of gain select circuit 906 as the peak value of the ac input voltage VAC 122 decreases.

The order in which some or all of the process blocks appear in each process disclosed herein should not be deemed limiting. Rather, one of ordinary skill in the art having the benefit of the present disclosure will understand that some of the process blocks may be executed in a variety of orders not illustrated.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A controller for use in a power supply, the controller comprising:

a zero crossing detection (ZCD) circuit coupled to generate a ZCD signal that pulses each zero-crossing of an ac input voltage of the power supply;

a threshold detection circuit coupled to receive and compare a signal representative of an output of the power supply with a threshold reference;

a punctuated switching control circuit coupled to the ZCD circuit and to the threshold detection circuit to generate a switching signal to control a switch to regulate the output of the power supply, wherein, the punctuated switching control circuit generates the switching signal having intervals of switching and intervals of no switching, wherein an ac input current of the power supply flows during the intervals of switching and not during the intervals of no switching, each interval of switching begins responsive to the threshold detection circuit indicating that the output of the power supply has dropped below the threshold reference, each interval of no switching begins responsive to the threshold detection circuit indicating that the output of the power supply has risen above the threshold reference, and each interval of switching and each interval of no switching has a beginning that is synchronized with a pulse of the ZCD signal.

2. The controller of claim 1, wherein the threshold reference includes a first upper threshold and a second lower threshold, wherein each interval of switching begins responsive to the threshold detection circuit indicating that the output of the power supply has dropped below the lower threshold reference, and wherein each interval of no switching begins responsive to the threshold detection circuit indicating that the output of the power supply has risen above the upper threshold reference.

3. The controller of claim 1, wherein each interval of switching and each interval of no switching has an ending that is synchronized with a pulse of the ZCD signal.

4. The controller of claim 1, wherein the switching signal is a punctuated switching signal, the controller further comprising:

a non-punctuated switching control circuit coupled to generate a non-punctuated switching signal to control the switch to regulate the output of the power supply; and a mode select circuit coupled to enable one of the punctuated switching control circuit and the non-punctuated switching control circuit and to disable the other of the punctuated switching control circuit and the non-punctuated switching control circuit responsive to an input power of the power supply.

5. The controller of claim 4, wherein the mode select circuit is coupled to enable the punctuated switching control circuit and to disable the non-punctuated switching control circuit responsive to the input power of the power supply being less than a power threshold.

6. The controller of claim 1, wherein the ZCD circuit comprises a comparator coupled to receive and compare an input voltage sense signal representative of a magnitude of the ac input voltage with a threshold reference voltage and to generate the ZCD signal in response thereto.

7. The controller of claim 6, wherein the threshold reference voltage is representative of an instantaneous ac input voltage of less than one volt.

8. The controller of claim 1, further comprising an oscillator coupled to the punctuated switching control circuit to generate a clock signal having a period, wherein the interval of switching includes a plurality of switching periods and wherein each of the plurality of switching periods are substantially equal to the period of the clock signal.

9. The controller of claim 1, wherein the controller is an integrated circuit controller and wherein the switch is included in the integrated circuit controller.

10. A power supply, comprising:

an energy transfer element;

a switch coupled to control the transfer of energy through the energy transfer element from an input of the power supply to an output of the power supply; and a controller coupled to the switch, the controller comprising:

a zero crossing detection (ZCD) circuit coupled to generate a ZCD signal that pulses each zero-crossing of an ac input voltage received at the input of the power supply;

a threshold detection circuit coupled to receive and compare a signal representative of the output of the power supply with a threshold reference;

a punctuated switching control circuit coupled to the ZCD circuit and to the threshold detection circuit to generate a switching signal to control the switch to regulate the output of the power supply, wherein, the punctuated switching control circuit generates the switching signal having intervals of switching and intervals of no switching, wherein an ac input current of the power supply flows during the intervals of switching and not during the intervals of no switching, each interval of switching begins responsive to the threshold detection circuit indicating that the output of the power supply has dropped below the threshold reference, each interval of no switching begins responsive to the threshold detection circuit indicating that the output of the power supply has risen above the threshold reference, and each interval of switching and each interval of no switching has a beginning that is synchronized with a pulse of the ZCD signal.

11. The power supply of claim 10, wherein the threshold reference includes a first upper threshold and a second lower threshold, wherein each interval of switching begins responsive to the threshold detection circuit indicating that the output of the power supply has dropped below the lower threshold reference, and wherein each interval of no switching begins responsive to the threshold detection circuit indicating that the output of the power supply has risen above the upper threshold reference.

12. The power supply of claim 10, wherein each interval of switching and each interval of no switching has an ending that is synchronized with a pulse of the ZCD signal.

13. The power supply of claim 10, wherein the switching signal is a punctuated switching signal, the controller further comprising:

a non-punctuated switching control circuit coupled to generate a non-punctuated switching signal to control the switch to regulate the output of the power supply; and a mode select circuit coupled to enable one of the punctuated switching control circuit and the non-punctuated switching control circuit and to disable the other of the punctuated switching control circuit and the non-punctuated switching control circuit responsive to an input power of the power supply.

14. The power supply of claim 13, wherein the mode select circuit is coupled to enable the punctuated switching control circuit and to disable the non-punctuated switching control circuit responsive to the input power of the power supply being less than a power threshold.

15. The power supply of claim 10, wherein the ZCD circuit comprises a comparator coupled to receive and compare an input voltage sense signal representative of a magnitude of the ac input voltage with a threshold reference voltage and to generate the ZCD signal in response thereto.

16. The power supply of claim 15, wherein the threshold reference voltage is representative of an instantaneous ac input voltage of less than one volt.

17. The power supply of claim 10, further comprising an oscillator coupled to the punctuated switching control circuit to generate a clock signal having a period, wherein the interval of switching includes a plurality of switching periods and wherein each of the plurality of switching periods are substantially equal to the period of the clock signal.

18. The power supply of claim 10, wherein the controller is an integrated circuit controller and wherein the switch is included in the integrated circuit controller.

19. A method, comprising:

generating a zero crossing detection (ZCD) signal in response to a zero-crossing of an ac input voltage of a power supply;

comparing an output voltage of the power supply with a threshold reference; and generating a switching signal to control a switch to regulate an output of the power supply, wherein the switching signal has an interval of switching and an interval of no switching, wherein an ac input current of the power supply flows during the interval of switching and not during the interval of no switching, wherein the interval of switching reoccurs in response to comparing the output voltage with the threshold reference, and wherein generating the switching signal includes:

synchronizing a beginning of the interval of switching with the zero-crossing of the ac input voltage; and synchronizing a beginning of the interval of no switching with another zero-crossing of the ac input voltage.

20. The method of claim 19, wherein generating the switching signal further includes delaying the beginning of each interval of switching until a next zero crossing of the ac input voltage in response to comparing the output voltage with the threshold reference.

21. The method of claim 19, wherein generating the switching signal further includes delaying the beginning of each interval of no switching until a next zero crossing of the ac input voltage in response to comparing the output voltage with the threshold reference.

22. The method of claim 19, wherein the threshold reference includes a first threshold reference and a second threshold reference, wherein the second threshold reference is greater than the first threshold reference, the method further comprising:

beginning the interval of switching in response to detecting that the output voltage is below the first threshold reference; and beginning the interval of no switching in response to detecting that the output voltage is above the second threshold reference.

23. The method of claim 19, wherein the switching signal is a punctuated switching signal, the method further comprising enabling modes of operation in response to an input power of the power supply, wherein a first mode of operation includes generating the punctuated switching signal, and wherein a second mode of operation includes generating a non-punctuated switching signal.

* * * * *